United States Patent [19]

Edahiro et al.

[11] Patent Number: 5,098,116
[45] Date of Patent: Mar. 24, 1992

[54] SUSPENSION SYSTEM FOR VEHICLE

[75] Inventors: Takeshi Edahiro; Toshiro Kondo; Fumitaka Ando; Tadanobu Yamamoto; Katsuyuki Komiya, all of Hiroshima, Japan

[73] Assignee: Mazda Motor Manufacturing, Japan

[21] Appl. No.: 622,100

[22] Filed: Nov. 29, 1990

[30] Foreign Application Priority Data

Nov. 29, 1989 [JP] Japan .................. 1-314080
Jan. 31, 1990 [JP] Japan .................. 2-23061

[51] Int. Cl.⁵ .................................... B62D 17/00
[52] U.S. Cl. .................... 280/661; 280/91; 280/675; 280/716
[58] Field of Search .............. 280/96.1, 661, 673, 280/675, 716, 91

[56] References Cited

U.S. PATENT DOCUMENTS

| 4,717,175 | 1/1988 | Arai et al. | 280/661 |
| 4,727,603 | 2/1988 | Sugiyama et al. | 280/661 |
| 4,835,714 | 5/1989 | Sano et al. | 280/661 |
| 4,842,295 | 6/1989 | Hawkins | 280/661 |

Primary Examiner—Kenneth R. Rice
Attorney, Agent, or Firm—Thompson, Hine and Flory

[57] ABSTRACT

In a suspension system for a vehicle constructed to change toe angle of wheels when receiving a lateral force, delay means for delaying toe angle change is provided at one of these: a front lateral link, a rear lateral link, and a trailing link. This structure results in a rapid cornering at an initial stage of cornering and a stability of wheels thereafter can be planned.

15 Claims, 6 Drawing Sheets

SUSPENSION SYSTEM FOR VEHICLE

BACKGROUND OF THE INVENTION

The present invention relates to a vehicle suspension system including two lateral links extending in the widthwise direction of a vehicle body and a trailing link extending longitudinally of the vehicle body.

As disclosed in the Japanese Patent Publication Gazette No. 62-56001, the conventional suspension system includes a wheel support member for supporting rear wheels revolvably, a front lateral link extending in the widthwise direction of the vehicle body, connected at one end to the vehicle body and the another end to the front side of the wheel support member, a rear lateral link extending in the widthwise direction of the vehicle body, connected at one end to the vehicle body and the another end to the rear side of the wheel support member, and a trailing link extending longitudinally of the vehicle body, connected at the front end to the vehicle body and the rear end to the wheel support member.

In this suspension system, since the intersecting point of the extended line of rotary axes of both the front and the rear lateral links to the wheel side is positioned to the rear of the rotary axis of the rear wheels, when an 22 ternal force, i.e. a lateral force, is received by a rear wheel (an outer wheel of steering) at cornering, a moment force is occurred to move the wheel support member to the rear, having the intersecting point of both the rotary axis of lateral links positioned to the rear of the revolving shaft of the wheel as a supporting point. The front lateral link swings to the rear of the vehicle body as if it brings the front part of the wheel support member inboard with respect to the vehicle, having the end portion on the vehicle body side as a supporting point. On the other hand, the rear lateral link swings to the rear of the vehicle body as if it brings the front part of the wheel support member into outboard, having the end portion on the vehicle body side as a supporting point. Thus, the toe angle is controlled by the lateral force at cornering of a vehicle to make rapid toe-in of rear wheels, and the roll understeer for higher stability of a vehicle may be obtained (refer to the Japanese Patent Application Laying Open Gazette No. 60-80946).

In stead of disposing the front and the rear lateral links in the above fashion, another conventional art for enhancing toe-in of the wheels, when receiving a lateral force at cornering of a vehicle, by changing the rigidity of the elastic bushing at the end portion on the vehicle body side or at the end portion on the wheel side of both lateral links has been known.

However, in the above conventional arts, when the lateral force is received by the rear wheel at cornering of a vehicle, the wheel is displaced to toe-in and roll understeer is promoted even at the initial stage of cornering of a vehicle. Thus, the rapid cornering at the initial stage of cornering gets worse.

SUMMARY OF THE INVENTION

The object of the present invention is to provide a vehicle suspension system which slightly delays the timing of toe-in of wheels, thereby both rapid cornering at the initial stage of cornering of a vehicle and the stability of a vehicle thereafter are achieved.

To achieve the above object, a vehicle suspension system which changes toe angle of wheels by a lateral force acting of wheels comprises wheel support member for supporting wheels rotatably, a front lateral link extending in the widthwise direction of the vehicle body, connected at one end to the vehicle body and another end to the front side of the wheel support member, a rear lateral link extending in the widthwise direction of the vehicle body, connected one end to the vehicle body and the another end to the rear side of the wheel supporting member, and a trailing link extending in the longitudinal direction of the vehicle body, connected the front end to the vehicle body and the rear end to the wheel support member. Delay means for delaying the timing of toe angle change of wheels when receiving the lateral force is provided in one of the front lateral link, the rear lateral link, or the trailing link.

By this structure, when the lateral force is received by the outer wheel (particularly the rear wheel which is not a control wheel) at cornering of a vehicle, the timing of the toe angle change, in more detail toe-in of the wheel, is delayed at the initial stage of cornering, thereby more rapid cornering can be achieved. The wheel is enhanced toe-in and roll understeer is promoted thereafter. Thus, the stability of a vehicle is improved.

The above and the objects, features, and advantages of the present invention will be more apparent with the description of the preferred embodiment made with referrence to the accompanying drawings.

BRIEF DESCRIPTION OF THE INVENTION

The preferred embodiment is shown in the accompanying drawing in which.

DETAILED DESCRIPTION OF THE INVENTION

The preferred embodiment of the present invention is described below with reference to the accompanying drawings.

Figure 1:
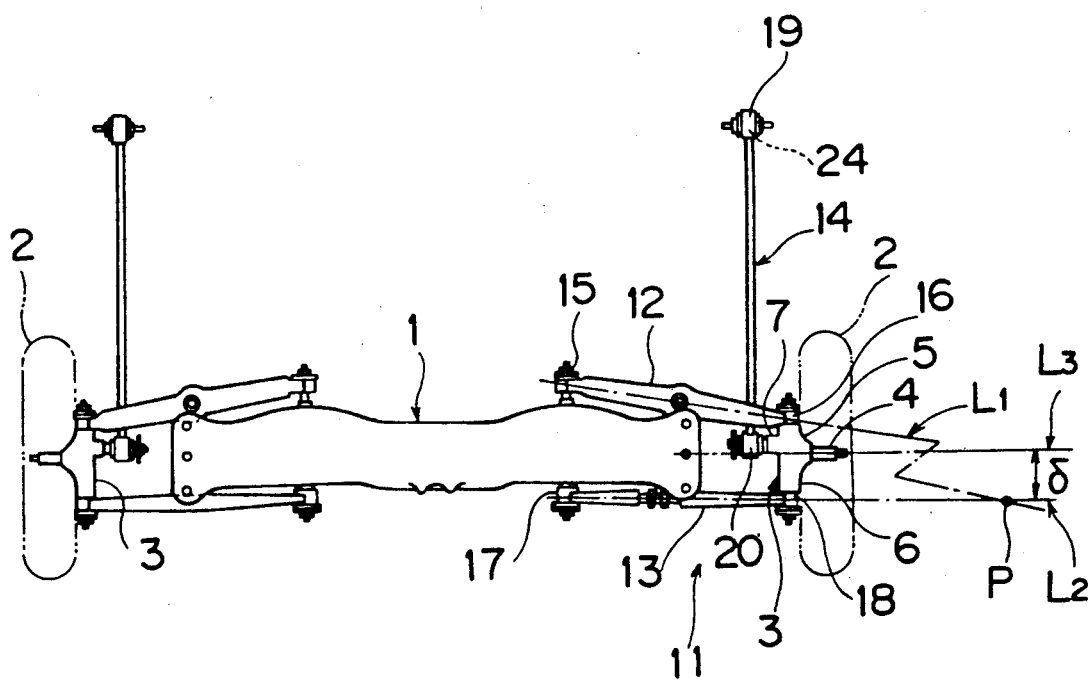
FIGS. 1-3 show the first embodiment of the present invention, a plan view of a suspension system for vehicles incorporated to a vehicle body, a sectional view of a vehicle body side end portion of a trailing link, and a characteristic diagram illustrating a delayed condition until toe-in of rear wheels is enhanced respectively.

FIG. 1 illustrates a vehicle suspension system of the first embodiment applied to a rear wheel side of a F.F (Front engine, Front dive) type vehicle. The referrence numeral 1 designates a rear cross member extending in the widthwise direction of a vehicle body as a vehicle body strengthen member, referrence numeral 2 designate a right and a left rear wheels, and vehicle body support member 3 for supporting each rear wheel 2 rotatably is provided in the inboard of each rear wheel 2. Since the left side of the vehicle body is symmetrical with the right side of the vehicle body, only description of the right side of the vehicle body will be made. The wheel support member 3 comprises a spindle 4 sticking out to the outboard with respect to the vehicle body, having the revolving shaft of the wheel as the rotary axis, a frontward stretching out part 5 stretching to the front of the vehicle body, a rearward stretching out part 6 stretching to the rear of the vehicle body, and an inward stretching out part 7 stretching to the inboard.

A suspension system 11 for supporting jouncely the rear wheels 2 (the wheel support member 3) to the side part of the rear coss member 1 is interposed between the side part of the rear cross member 1 and the wheel support member 3. The suspension system 11 comprises a pair of lateral links, a front lateral link 12 and a rear lateral link 13 both extending in the widthwise direction of the vehicle body, and a trailing link 14 extending in the longitudinal direction of the vehicle body. One end (the inner end) of the front lateral link 12 is swingably connected to the front end of the side part of the rear cross member 1 through an elastic bushing 15, and the another end (the outer end) is also swingably connected to the front end of the frontward stretching out part 5 of the wheel support member 3 through an elastic bushing 16. Similarly, one end (the inner end) of the rear lateral link 13 is swingably connected to the rear end of the side part of the rear cross member 1 through an elastic bushing 17, and the another end (the outer end) is swingably connected to the rear end of the rearward stretching out part 6 of the wheel support member 3 through an elastic bushing 18. The front end of the trailing link 14 is swingably connected to a frame member (not shown in the drawing) which is a vehicle body strengthen member through an elastic bushing 19, and the rear end is swingably connected to the inward stretching out part 7 of the wheel support member 3 through an elastic bushing 20.

The above front and the rear lateral links 12 and 13 are disposed to be unparallel, the intersecting point P of the extended line $L_1$ of the rotary axis of the front lateral link in the rear wheel direction (outward of the vehicle body) and the extended line $L_2$ of the rotary axis of the rear lateral link in the rear wheel direction is positioned to the rear of the rotary axis $L_3$ of the rear wheel 2 with the fixed longitudinal distance δ from $L_3$. By disposing the lateral links 12, 13 in this fashion, when the outer wheel of steering receives the lateral force during cornering, the end portion 16, 18 (the elastic bushing provided therein) on the wheel side swing to the rear of the vehicle body, having the end portion 15, 17 (the elastic bushing provided therein) on the vehicle body side of the front and the rear lateral link 12, 13 as supporting points. Thus, the wheel support member 3 and the rear wheel 2 are enhanced toe-in. The trailing link 14 is disposed swingably to the inboard, having a end portion 19 (the elastic bushing provided therein) on the vehicle body side as its supporting point, so that the front and the rear lateral links 12, 13 are allowed to swing to the rear of the vehicle body by the lateral force acting on the outer wheel of steering at cornering of a vehicle.

Figure 2:
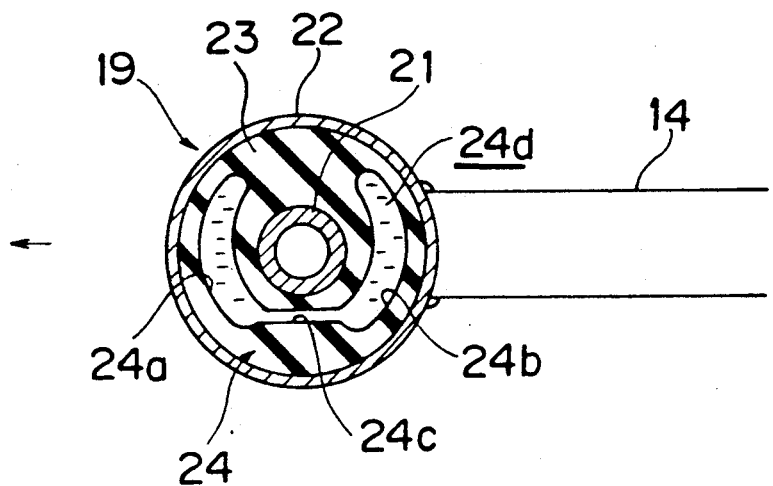

As shown in FIG. 2, the elastic bushing 19 comprises a inner sleeve member 21 extending in the widthwise direction of the vehicle body and swingably supported by the frame member, an outer sleeve member 22 disposed coaxially in the periphery of the inner sleeve 11 and fixed to the front end of the trailing link 14, and a rubber 23 disposed between the inner sleeve 21 and an outer sleeve 23. Provided in the elastic bushing 19 is a delay member 24 for delaying the the front and the rear lateral links 12, 13 which make the end portion 16, 18 on the vehicle body side swing to the rear of the vehicle body, having the end portion 15, 17 on the vehicle body side of the front and the rear lateral links 12, 13 as the supporting point. This delay means 24 is composed of a front chamber 24a positioned at the front part of the inner sleeve 21 in the rubber 23, a rear chamber 24b positioned at the rear part of the inner sleeve 21, a passageway 24c for communicating the front chamber 24a and the rear chamber 24b, a fluid 24d filled in the front and the rear chamber 24a, 24b and the passageway 24c. When the trailing link 14 is trying to rotate toward the inboard by the external force acting on the trailing link 14 by the swing of the front and the rear lateral link 12, 13 by the lateral force at cornering of a vehicle, the swing of the trailing link 14 is delayed by throttle at the passageway 24c where the fluid 24a go through when the fluid 24a flows from the front chamber 24a of the delay means 24 to the rear chamber 24b.

Figure 3:
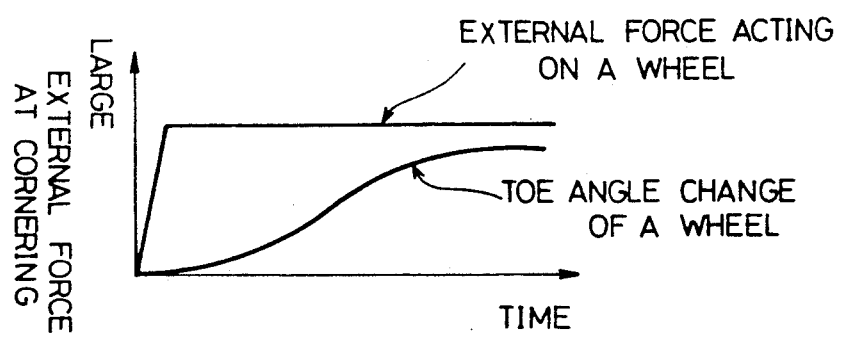

In this first embodiment, the rear wheel 2, the outer wheel of steering, receives the lateral force at cornering of the vehicle. The moment force which moves the wheel support member 3 to the rear is occurred in the rear wheel 2, having the intersecting point P of the extended line $L_1$ and $L_2$ of the rotary axes of the front and the rear lateral links positioned to the rear of the rotary axis $L_3$ of wheel as a supporting point. By this rearward movement of the wheel support member 3, the front lateral link 12 swings as if it bring the front part of the wheel support member 3 into inboard, having the end portion (the elastic bushing) on the vehicle side as a supporting point. Also, the rear lateral link 13 swings as if it pushs the rear part of the wheel support member 3 to the outboard, the end portion 17 (the elastic bushing) on the vehicle side as a supporting point. Provided in the elastic bushing 19 on the vehicle body side of the trailing link 14 is the delay means 24 which supplys fluid 24d between the front chamber 24a and the rear chamber 24b through the passageway 24c by the external force acting on the bushing 19. The rearward swings of the front lateral link 12 and the rear lateral link 13 by the lateral force at cornering of the vehicle is delayed indirectly by the delay means 24. Through this process, as shown in FIG. 3, the toe angle of the rear wheels 2 are changed a little at the initial stage of cornering of the vehicle so that the rapid cornering can be achieved. The toe-in of the rear wheel 2 promotes roll understeer thereafter so that the higher stability can be improved.

Figure 4:
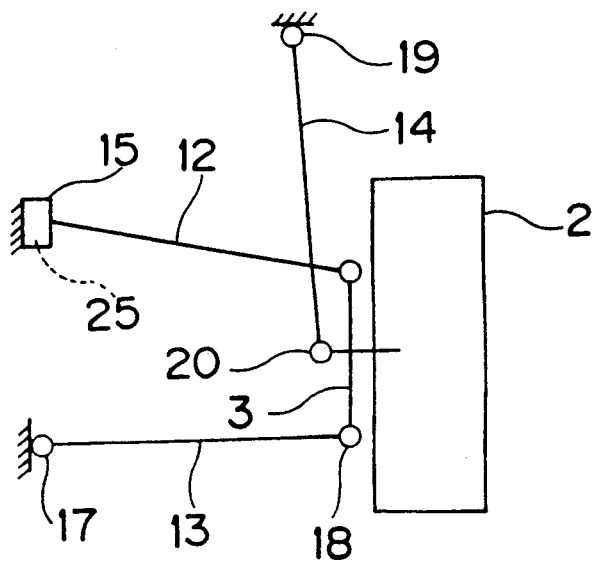
FIGS. 4 and 5 show the second embodiment, a skeleton diagram illustrating main components of a vehicle suspension system, a sectional view of a vehicle body side end portion of a front lateral link respectively.
Figure 5:
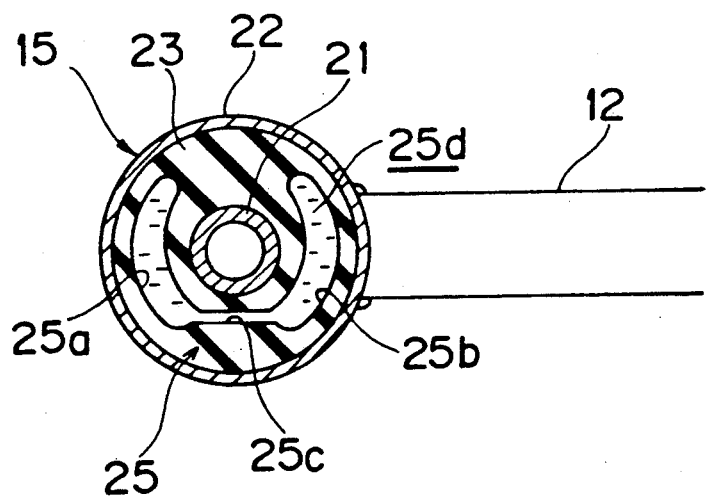

FIGS. 4 and 5 show the second embodiment of the present invention. In this embodiment, a delay member 25 for delaying the swing toward the rear of the vehicle body, having the vehicle body side end portion of the front and the rear lateral links 12, 13 as supporting points, is provided at the elastic bushing 15 at the end portion on the vehicle body side of the front lateral link 12. In a rubber 23 of the elastic bushing 15, this delay means 25 is composed of a pair of fluid chambers 25a, 25b, the inner sleeve 21 interposed therebetween, a passageway 25c for communicating the fluid chambers 25a, 25b, and a fluid 25d filled in the fluid chamber 25a, 25b and a passageway 25c. The other structure of the suspension system are the same as the first embodiment and the same numeral references are used for the identical components to avoid repeating the reference.

In this second embodiment, by the delaying means 25 provided in the elastic bushing 15 at the end portion on the vehicle body side of the lateral link 12, the movement to the rear vehicle body of the lateral link 12 is delayed so as to gain better rapid cornering at the initial stage of cornering of the vehicle. The same result is gained when the delay means 25 is provided at the elastic bushing 17 at the end portion on the vehicle body side of the rear lateral link 13.

Figure 6:
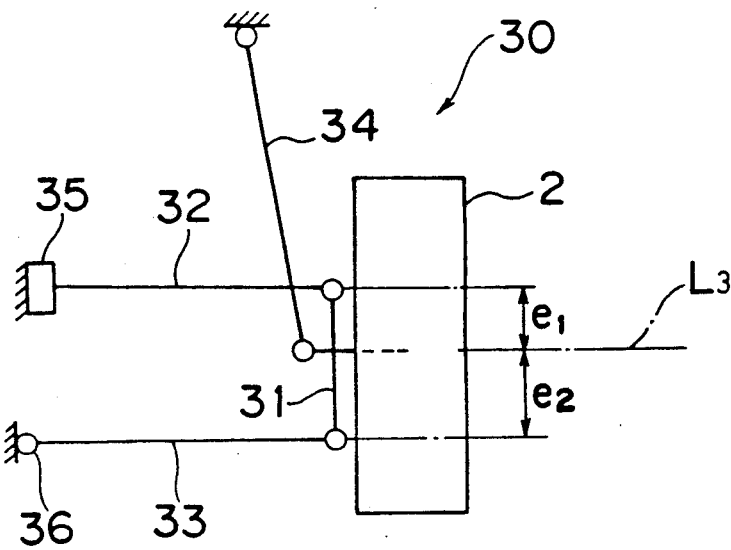
FIGS. 6-9 show the third embodiment, a diagram corresponding to FIG. 4, a sectional view of a vehicle body side end portion of a front lateral link, a sectional view of a vehicle body side end portion of a rear lateral link, a diagram corresponding to FIG. 3.

FIG. 6 shows the third embodiment of the present invention. A suspension system 30, according to this embodiment, comprises followings as the first embodiment: a wheel support member 31 for supporting the wheels 2 rotatably, a front lateral link 32 extending in the widthwise direction of the vehicle body and swingably connected at its inner end to the vehicle body (the rear cross member, etc.) and at its outer end to the front part of the wheel support member 31, a rear lateral link 33 extending in the widthwise direction of the vehicle body and swingably connected at its inner end to the vehicle body (the rear cross member, etc.) and at its outer end to the rear part of the wheel support member 31, a trailing link 34 extending longitudinally of the vehicle body having it front end pivotably connected to the vehicle body (a frame member, etc.) and at its rear end to the wheel support member 31.

Figure 7:
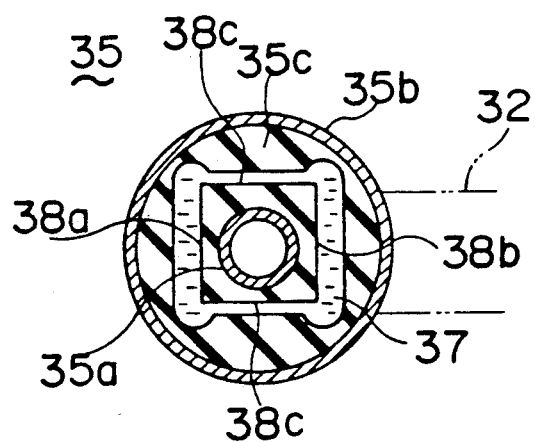
Figure 8:
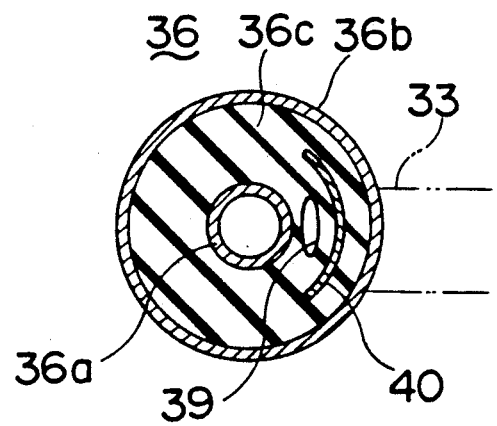

In a suspension system 30, a front lateral link 32 is disposed to be approximately parallel with a rear lateral link 33, and the rigidity of an elastic bushing 35 provided at the end portion on the vehicle body side of the front lateral link 32 is set smaller than that of an elastic bushing 36 provided at the end portion on the vehicle body side of the rear lateral link 33. According to this structure, at cornering the lateral force acting on the rear wheel 2, an outer wheel of steering, displaces the wheel to toe-in. In short, the elastic bushing 36 is composed of a rubber 36c interposed between an inner sleeve 36a and an outer sleeve 36b as shown in FIG. 8, while the elastic bushing 35 is composed of the fluid build up bushing for filling fluid inside a rubber 35c interposed between an inner sleeve 35a and an outer sleeve 35b as shown in FIG. 7.

The space for building up a fluid 37 in the elastic bushing 35 is composed of a pair of fluid oil chambers 38a, 38b facing to each other on the rotary axis of the front lateral link 32, the inner sleeve 35a is interposed therebetween, and a pair of passageways 38c for communicating both fluid chambers 38a, 38b. When the rear wheel 2 receives the lateral force, the rear wheel 2 is displaced toe-in by the elastic deformation of the elastic bushing 35 (rubber 35c). According to this elastic modification, the fluid 37 flows between the fluid chambers 38a, 38b, and the toe angle change of the rear wheels 2 is delayed by the throttle of the passageway 38c. Thus, the elastic bushing 35 also accomplishs the function as delay means for delaying the toe angle change of the rear wheel when receiving the lateral force.

On the other hand, in the rubber 36c of the elastic bushing 36, a hollow 39 is formed to cause the elastic deformation easily on the rotary axis of the lateral link 33, and a metal 40 is buried to lessen the elastic deformation after the hollow 39 is crushed. In the third embodiment, in order to displace the rear wheel 2 toe-in when receiving the lateral force, the distance e1 between the rotary axis $L_3$ of the rear wheel 2 and the front lateral link 32 is set shorter than the distance e2 between the rotary axis $L_3$ of the rear wheel 2 and the rear lateral link 33, other than changing the rigidity of the elastic bushing 35, 36.

Figure 9:
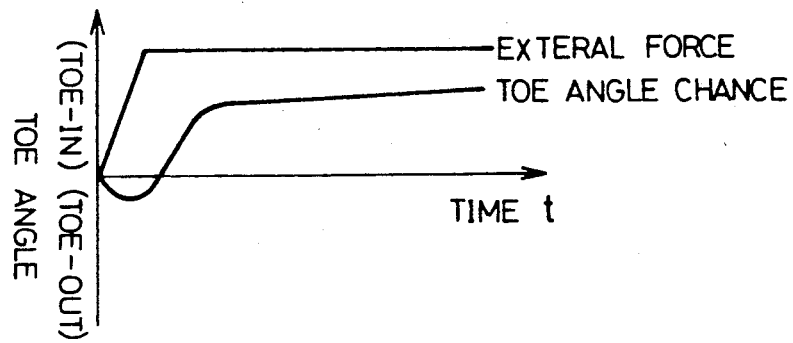

Accordingly, in the third embodiment, since the elastic bushing 35 of the front lateral link 32 has a function to delay toe angle change of the rear wheel 2 by the elastic deformation, and the elastic bushing 36 of the rear lateral link 33 has the hollow therein to cause the elastic deformation easily, at the initial stage of cornering of the vehicle when the lateral force acts of the rear wheel 2, as shown in FIG. 9, toe-out of the rear wheel 2 is enhanced, and the rapid cornering can be achieved. The rear wheel 2 is controlled to be toe-in thereafter, and the stability can get higher.

Figure 10:
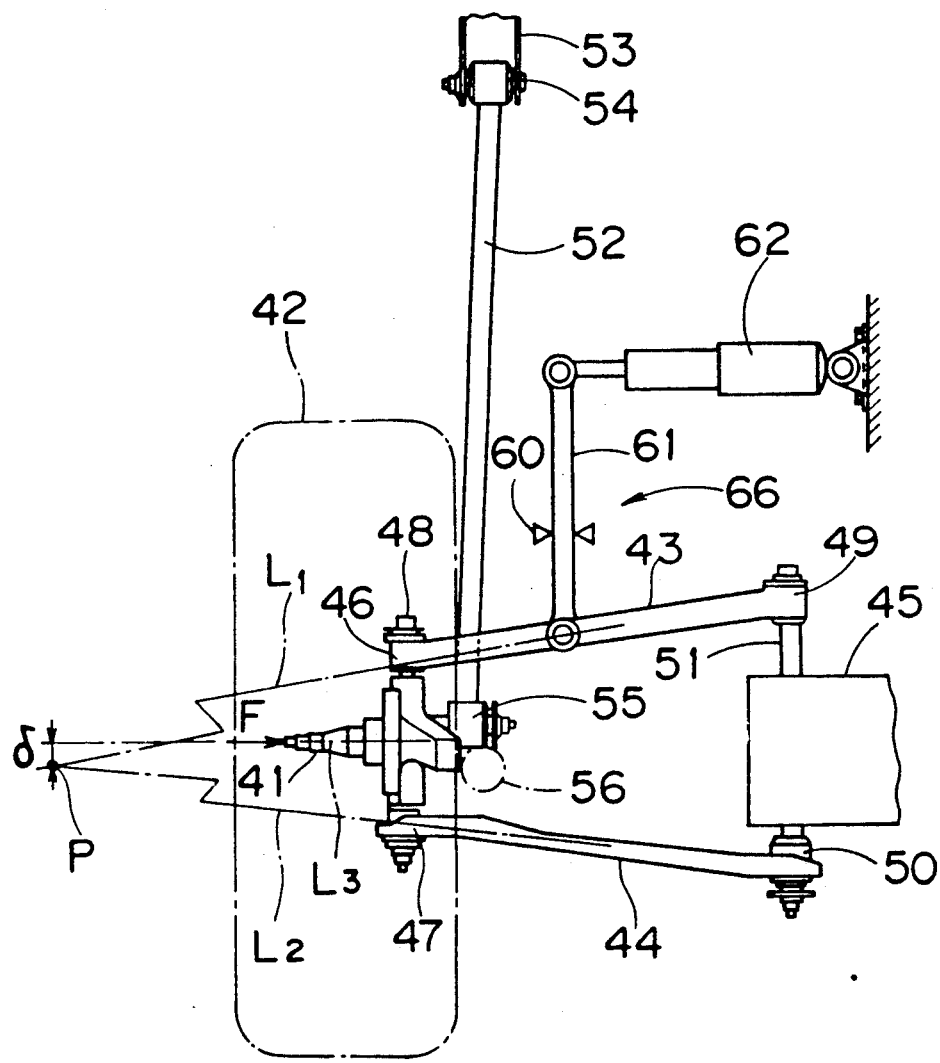
FIGS. 10 and 11 show the forth embodiment, a plan view of a vehicle suspension system, a sectional view illustrating a structure of a supporting point of rod member respectively.

FIG. 10 shows the suspension system of the forth embodiment, wherein the reference numeral 41 designates a wheel support member for supporting a rear wheel 42 rotatably, reference numeral 43, 44 designate a pair of lateral links extending in the widthwise direction of a vehicle body between the wheel support member 41 and a cross member in the vehicle body side, having one ends (the outer ends) of the lateral links 43, 44 connected to the wheel support member 41 through elastic bushings 46, 47 and a supporting shaft 48, and the other ends (the inner ends) to the cross member in the vehicle body side through elastic bushings 49, 50 and a supporting shaft 51.

The front lateral link 43 is inclined in the widthwise direction of the vehicle body in order to dispose its outer end (the elastic bushing 46 side) in the rear of its inner end (the elastic bushing 49 side). On the other hand, the rear lateral link 44 is inclined in the widthwise direction of the vehicle body in order to dispose its outer end (the elastic bushing 47 side) to the front of its inner end (the elastic bushing 50 side), the inclined angle of the rear lateral link 44 is smaller than that of the front lateral link 43. Thus, the pair of lateral links 43, 44 are unparallel, and the intersecting point P of the rotary axes $L_1$, $L_2$ is positioned in the outside of the rear wheel 42 and in the rear of the rotary axis $L_3$ with the longitudinal distance δ from $L_3$. The elastic bushing 46, 47, 49, 50, not shown in the drawings, are composed of outer sleeves fixed to the lateral link 43 or 44, inner sleeves coaxially disposed inside the outer sleeves, the supporting shaft 48 or 51 passes therethrough, and a rubber filled up between the inner and the outer sleeves. In this embodiment, when outer ends of lateral links 43, 44 are connected to the wheel support member 41, or when the inner ends are connected to the cross member 45, each supporting shaft 48 or 51 is used for both lateral links 43, 44 in order to reduce the number of components.

The reference numeral 52 designates a longitudinally extending trailing link, pivotably connected one end (the front end) to a bracket 53 fixed to the vehicle body though an elastic bushing 54, etc. and the another end (the rear end) to the wheel support member 41 through an elastic bushing 55, etc. Reference numeral 56 designates a vertically extending strut connected the upper end to the vehicle body and the lower end to the wheel support member. The wheel support member 41 is supported by the vehicle body through the lateral links 43, 44, the trailing link 52, and the strut 56.

Figure 11:
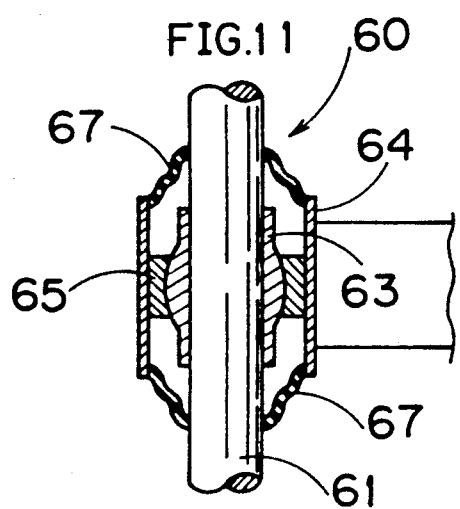

The reference numeral 61 designates a rod member extending longitudinally of the vehicle body, connected one end (the rear end) to the mid-position of the front lateral link 43 in the axial direction and the another end (the front end) to a shock absorber 62. The shock absorber 62 extending in the widthwise direction at the front end of the rod member 61, i.e., approximately perpendicular to the rod member 61 is connected at the another end to the vehicle body. The above rod member 61 is pivotably supported by the vehicle body through a support member 60 at the connecting portion with the lateral link 43. The support member 60 (the supporting point) comprises, as shown in FIG. 11, pillow balls 63 of projecting spheric configuration fixed to the rod 61, a cylinder member 64 provided in the vehicle body side, and retiner members 65 contacted with the cylinder member 64, having recessed spheric configuration to contact with the pillow balls 63. The rod member is pivotably supported about the center of the pillow balls 63. An enlarge means 66, which enlarges the quantity of displacement in the axial direction of the lateral link 43 and transmits it to the shock absorber 62 as a displacement in the axial direction and a load in the axial direction, is composed of a lever mechanism of the rod member 61 and the support member 60. The shock absorber 62 generates a dumping force against the load in the axial direction of the lateral link 43 transmitted enlargely by the enlarge means 66, and also accomplishes a function as delay means for delaying the displacement in the axial direction of the lateral link 43 or the toe angle change of the rear wheel 42. In FIG. 11, reference numeral 67 designates a boot which covers space between the end of the cylinder member 64 and the rod member 61.

The operation of the forth embodiment is described below. At cornering of a vehicle, when the rotary axis $L_3$ of the rear wheel 42 receives the lateral force toward the inboard, i.e. a cornering force, a couple ($F^*\delta$) is generated at the rear wheel 42 and the wheel support member 41 since the intersection point P of the rotary axes $L_1$, $l_2$ of the front and the rear lateral links is positioned outside of the rear wheel 42 and in the rear of the revolving shaft $L_3$ with the offset value $\delta$. Accordingly, a compressive load in the axial direction is received by the front lateral link 43. Thus, the lateral link 43 is displaced in the axial direction by the elastic deformation of the elastic bushing 49 at the connecting portion in the vehicle body side. In this case, the displacement in the axial direction of the lateral link 43 is restricted completely since the enlarge means 66 enlarges the quantity of displacement in the axial direction of the lateral link 43 and transmits it as a displacement in the axial direction or a load in the axial direction to the shock absorber 62, which generates large dumping force or a dumping resistance immediately after starting cornering when the lateral link 43 suddenly receives the axial compressive load.

After that (after the lateral link 43 receives the constant axis compressive load), the shock absorber 62 extends without generating the dumping force so that the axial displacement is allowed. Consequently, a component by the front and the rear lateral links 43, 44 and the wheel support member 41 is modified having the intersecting point P of the rotary axes of the lateral links 43, 44 as its center, and toe-in of the rear wheel 42 is promoted (inside toward the driving direction).

As mentioned above, according to the present embodiment, toe-in of the rear wheel 42 as an outer wheel of steering is restricted immediately after the cornering, and toe-in of the rear wheel 42 is promoted thereafter. This results in both rapid cornering and higher stability at cornering of a vehicle. Moreover, a comfortable driving can be maintained since the elastic bushing 46, 47, 49, 50 at the both ends of lateral links 43, 44 are soft as the conventional art in order to prevent vibration of the rear wheel 42 from being transmitted.

Figure 12:
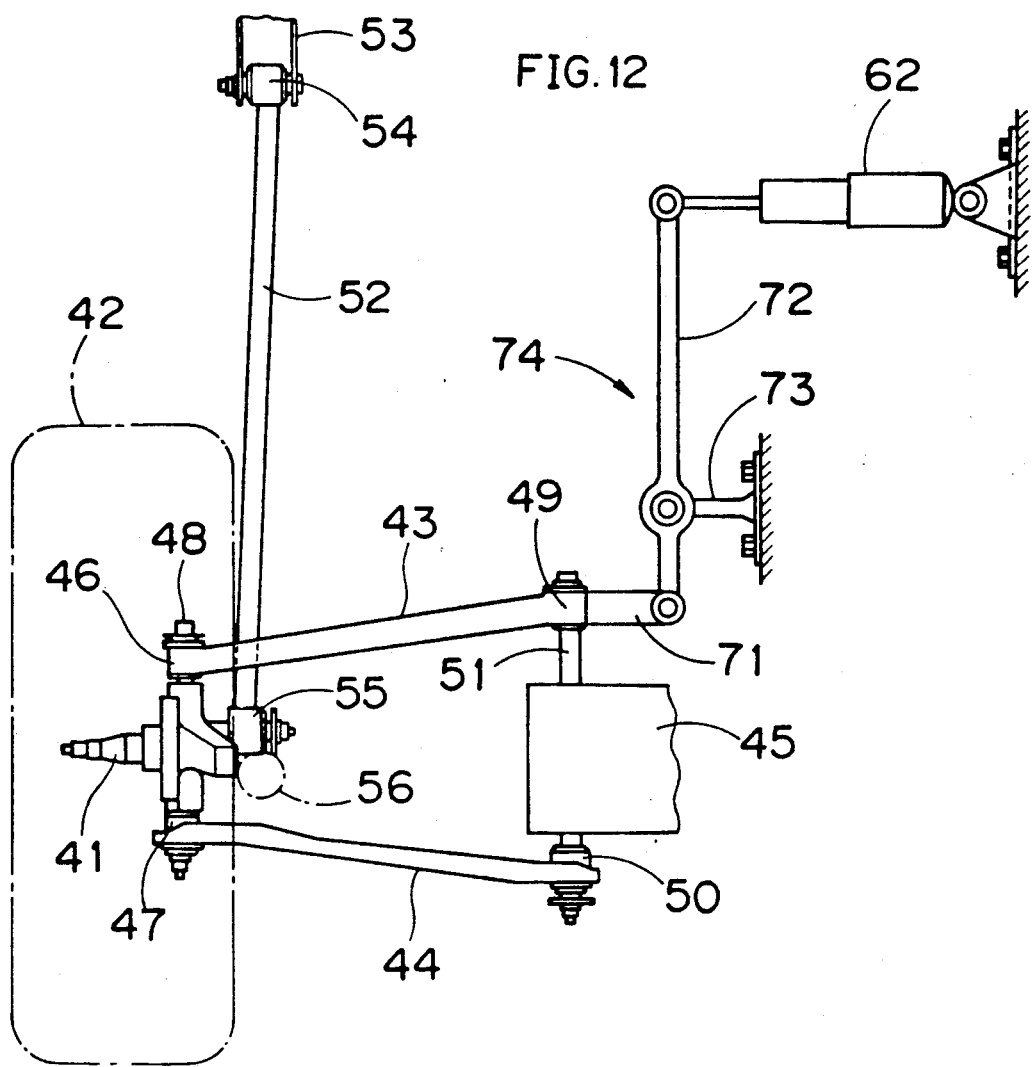
FIG. 12 shows the fifth embodiment and corresponds to FIG. 10.

FIG. 12 show the fifth embodiment of the present invention. In this embodiment, at the inner end of the front lateral link 43, a stretching part 71 stretches to the inboard from the elastic bushing 49, a connecting part with a cross member 45, formed either integrally or independently. A rod member 72 extending longitudinally of the vehicle body is is connected at the one end (the rear end) to the stretching out part 71 and the another end (the front end) to the shock absorber 62 as delay means. The rod member 72 is pivotably supported by the vehicle body through a support member 73 having a supporting shaft, etc. in the connecting part side with the stretching out part 71. An enlarge means 74, which enlarges the quantity of displacement in the axial direction of the lateral link 43 and transmits it to the shock absorber 62 as a displacement in the axial direction or a load in the axial direction, is composed of the lever mechanism having the rod member 72 and the support member 73. The other parts of the suspension system is the same as the forth embodiment, and the same numeral reference are used for the identical parts in order to avoid repeating the reference.

It will be understood that since the toe-in of the rear wheel 42, outer wheel of the steering, is restricted immediately after the cornering of a vehicle and toe-in of the rear wheel 42 is promoted thereafter, both the rapid cornering and stability of a vehicle at cornering can be achieved in the fifth embodiment as the forth embodiment.

Figure 13:
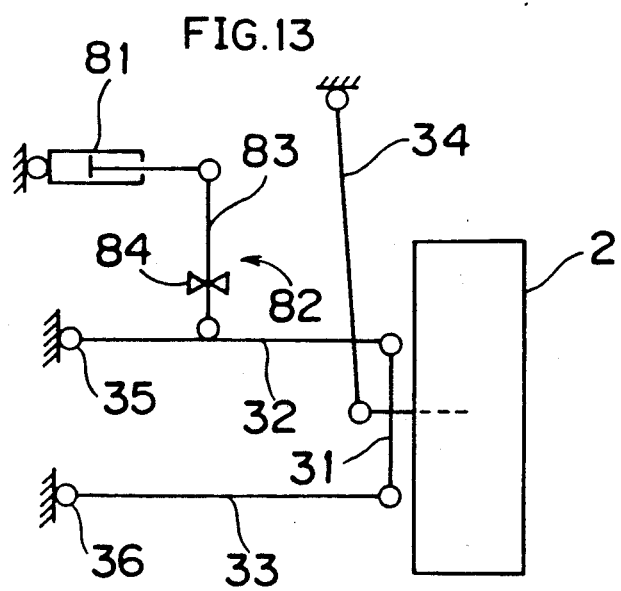
FIG. 13 shows the sixth embodiment and corresponds to FIG. 4.

FIG. 13 shows the sixth embodiment of the present invention. The suspension system according to this embodiment comprises, basically the same as the third embodiment, the wheel support member 31 for supporting the wheel 2 rotatably, the pair of parallel lateral links 32, 33 extending in the widthwise direction of the vehicle body, pivotably connected at one end to the vehicle body (rear cross member, etc.) and at another end to the wheel support member 31 through the elastic bushing 35 or 36, and the trailing link 34 extending longitudinally of the vehicle body, pivotably connected at the front end to the vehicle body and at the rear end to the wheel support member 31. The rigidity of the elastic bushing 35 at the end portion on the vehicle body side of the front lateral link 32 is set smaller than that of the elastic bushing 36 at the end portion on the vehicle body side of the rear lateral link 33. By this structure, the rear wheel 2 is displaced toe-in by the lateral force acting on the rear wheel 2, an outer wheel of steering, at cornering of a vehicle.

Furthermore, the suspension system of this embodiment comprises a shock absorber 81 as delay means for delaying the toe angle change of wheels when receiving the lateral force and an enlarge means 82 which enlarges the quantity of the displacement in the axial direction of the front lateral link 32 and transmits it to the shock absorber 81. The enlarge means 82 is composed of the lever mechanism having a rod member 83 extending longitudinally of the vehicle body, connected at one end (the rear end) to the mid-position in the axial direction of the front lateral link 32 and at another end (the front end) to the shock absorber 81, and a support member 84 which pivotably supports the rod member 83 in the connecting part side to the lateral link 32. The above shock absorber 81 extends to the inboard from the connecting part with the rod member 83.

What is claim is:

1. A suspension system for a vehicle constructed to change toe angle of wheels by a lateral force acting on wheels, a suspension system for vehicles having a wheel support member for supporting wheels rotatably, a front lateral link extending in the widthwise direction of a vehicle body having one end connected to the vehicle body and another end to the front part side of said wheel support member, a rear lateral link extending in the widthwise direction of the vehicle body having one end connected to the vehicle body and the another end to the rear part side of said wheel support member, and a trailing link extending in the longitudinal direction of the vehicle body having the front end thereof connected to the vehicle body and the rear end to said wheel support member, wherein the improvement comprises:

a delay means for delaying toe angle change of wheels when receiving said lateral force provided in one of said front lateral link, said rear lateral link, or said trailing link.

2. A suspension system for a vehicle claimed in claim 1, wherein said front and said rear lateral links are disposed to be unparallel, the intersection point of said lateral links is positioned in the outside of a corresponding wheel and to the rear of the rotary axis of said wheel, and said wheel is displaced to toe-in when receiving said lateral force.

3. A suspension system for a vehicle as claimed in claim 1, wherein an elastic bushing is provided at each end portion on the vehicle side and on the wheel side of said front and said rear lateral links, a rigidity of said elastic bushing of said front lateral link is set lower than a rigidity of said elastic bushing of said rear lateral link, said wheel is displaced to toe-in when receiving said lateral force.

4. A suspension system for a vehicle as claimed in claim 1, wherein an elastic bushing is provided at each end portion on the vehicle side and on the wheel side of said front and said rear lateral links, the rigidity of said elastic bushing of said front lateral link differs from the rigidity of said elastic bushing of said rear lateral link, said wheel is displaced to toe-out at a initial stage of receiving said lateral force and said wheel is displaced to toe-in thereafter.

5. A suspension system for a vehicle as claimed in claim 3, wherein a distance between a rotary axis of said wheel and said front lateral link is set shorter than a distance between a rotary axis of said wheel and said rear lateral link.

6. A suspension system for a vehicle as claimed in claim 4, wherein said elastic bushing of said front lateral link is composed of a fluid build up bushing by building up a fluid into a rubber fixed between an inner sleeve and an outer sleeve, and said elastic bushing of said rear lateral link has a hollow in a rubber fixed between an inner sleeve and an outer sleeve for easing elastic deformation.

7. A suspension system for a vehicle as claimed in claim 1, wherein said elastic bushing composed of a rubber filled between an inner sleeve and an outer sleeve and said delay means is provided at an end portion on the vehicle body side of said trailing link.

8. A suspension system for a vehicle as claimed in claim 7, wherein said delay means comprises a pair of chambers formed in a rubber of an elastic bushing having an inner sleeve therebetween, a passageway for communicating said both chambers, and a fluid filled in said chambers and said passageway.

9. A suspension system for a vehicle as claimed in claim 1, wherein an elastic bushing composed of a rubber filled between an inner sleeve and an outer sleeve is provided at each end portion on the vehicle body side of said front and said rear lateral links, and said delay means is provided at an end portion on the vehicle body side of either one of said lateral links.

10. A suspension system for a vehicle as claimed in claim 9, wherein said delay means comprises a pair of chambers formed in a rubber of an elastic bushing having an inner sleeve therebetween, a passageway for communicating said both chambers, and a fluid filled in said chambers and said passageway.

11. A suspension system for a vehicle as claimed in claim 1, wherein an elastic bushing composed a rubber between an inner sleeve and an outer sleeve is provided at each end portion on the vehicle body side of said front and said rear lateral links, said delay means is composed of a shock absorber which generates a dumping force along with the displacement in the axial direction of either one of said lateral links when receiving said lateral force.

12. A suspension system for a vehicle as claimed in claim 11, wherein an enlarge means which enlarges quantity of displacement in the axial direction of said lateral link and transmits it to a shock absorber is disposed between said shock absorber and said lateral link.

13. A suspension system for a vehicle as claimed in claim 12, wherein said enlarge means is composed of a lever mechanism comprising a rod member having at one end thereof connected to said lateral link and the another end to said shock absorber, and a support member which swingably supports said rod member in said lateral link side.

14. A suspension system for a vehicle as claimed in claim 12, wherein said enlarge means is connected to a midposition in the axial direction of said lateral link.

15. A suspension system for a vehicle as claimed in claim 12, wherein said enlarge means is connected to a stretching out part which stretches out to the inboard from an end portion on the vehicle body side of said lateral link.

* * * * *